United States Patent

[11] 3,601,454

| [72] | Inventor | Harold L. Reinsma |
| | | Dunlap, Ill. |
| [21] | Appl. No. | 834,626 |
| [22] | Filed | June 19, 1969 |
| [45] | Patented | Aug. 24, 1971 |
| [73] | Assignee | Caterpillar Tractor Co |
| | | Peoria, Ill. |

[54] CARTRIDGE JOINT FOR HEAVY DUTY TRACK CHAIN
5 Claims, 3 Drawing Figs.

[52] U.S. Cl............................................. 305/11,
305/14, 305/54, 305/58, 74/257, 287/100
[51] Int. Cl................................................ B62d 55/20
[50] Field of Search........................................ 305/11, 14,
58, 59; 74/250, 251, 254, 255, 256, 257; 287/100

[56] References Cited
UNITED STATES PATENTS

| 1,186,785 | 6/1916 | Holt | 305/58 |
| 2,541,157 | 2/1951 | Fulke | 74/254 |
| 2,598,828 | 6/1952 | Phelps | 305/11 |
| 2,780,830 | 2/1957 | Kammerer | 74/254 X |
| 3,309,864 | 3/1967 | Arndt | 305/59 |
| 3,463,560 | 8/1969 | Reinsma | 305/11 |

*Primary Examiner*—Richard J. Johnson
*Attorney*—Fryer, Tjensvold, Feix, Phillips & Lempio ABSTRACT: A cartridge joint for a heavy-duty track chain having fork-and-blade-type track links and midpitch drive lugs. The cartridge joint comprises a hollow pin with an integral head on one end thereof, a flanged ring fixedly mounted on the other end thereof, and an intermediate rotatable bushing which is kept from moving axially on the pin by abutment surfaces on the head and ring. The midpitch drive lugs are provided with retaining locks to hold the cartridge joints in place.

INVENTOR
HAROLD L. REINSMA

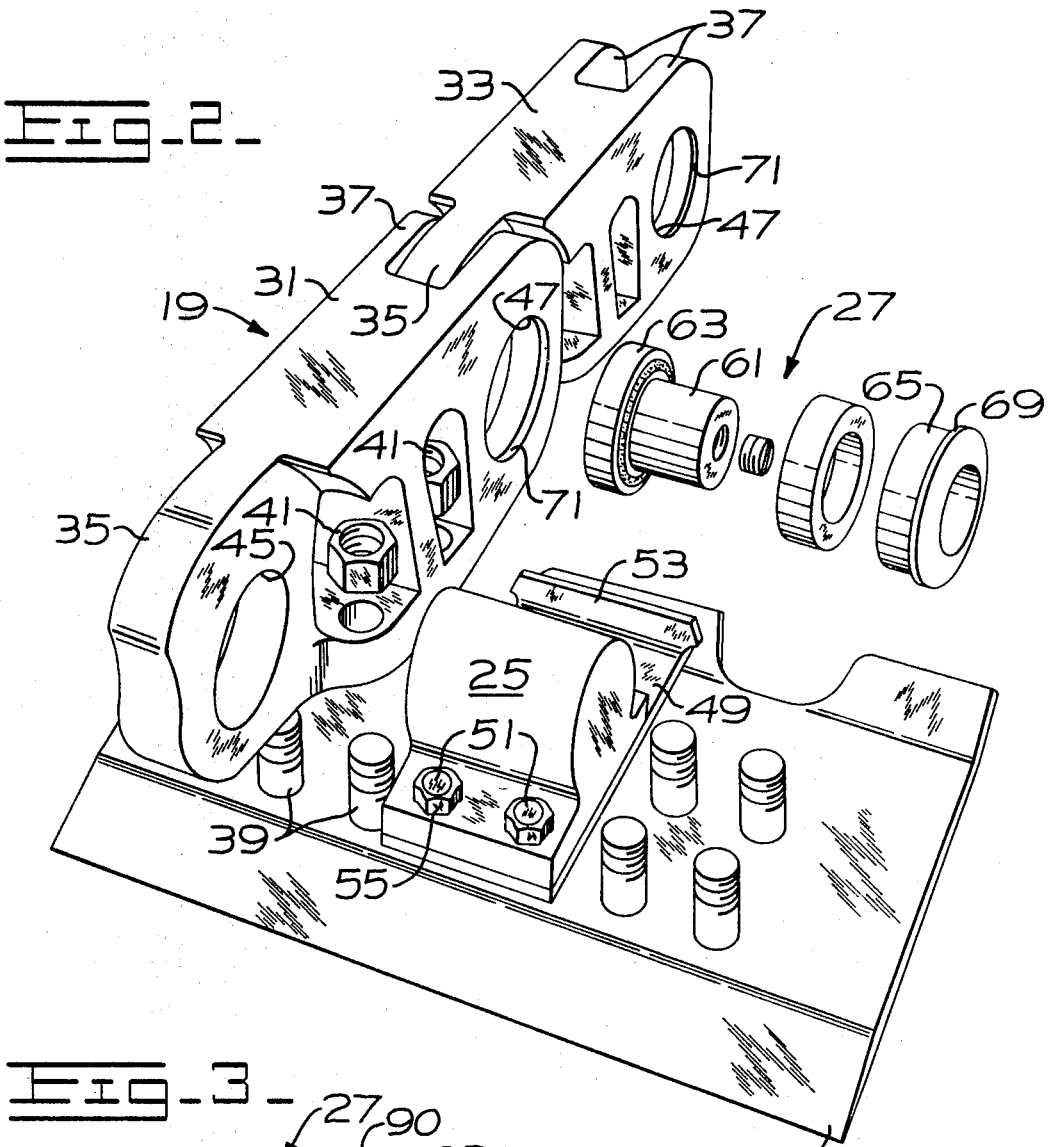

CARTRIDGE JOINT FOR HEAVY DUTY TRACK CHAIN

BACKGROUND AND SUMMARY OF THE INVENTION

This invention relates to a cartridge joint for use in a heavy-duty track chain of the fork and blade type.

In present day earthmoving equipment, a large increase in size and weight has been experienced. Due to the severe operating conditions under which such equipment is utilized, a high rate of failure of undercarriage components has required that attention be directed to the improvement of these components.

Conventional track rollers, track links, drive means, etc., cannot satisfactorily withstand severe abuse and the increased speed requirements.

Additionally, it has become necessary to manufacture equipment which can readily be repaired in the field so as to minimize the "downtime" of such equipment.

The present invention provides a cartridge joint for use with track links which will produce greater strength in the connection of the links, reduce the cost of the apparatus to connect the links, and may easily be replaced in the field.

The cartridge joint can be replaced without disassembly of any other joint, thus eliminating the conventionally utilized "master joint." Further, the cartridge joint can be preassembled and permanently lubricated at the factory, thereby minimizing the possibility of contamination thereof during field replacement.

In general, the cartridge joint of the instant invention comprises a hollow pin with a head on one end thereof and a flanged ring fixedly mounted on the other end thereof. A rotatable bushing is situated intermediate, and positioned by, the head and the ring, and the assembly is fitted within a fork-and-blade-type track link. The joint is held in its linking position by the flange on the ring and by a retaining lock on the track shoe.

This invention, together with its further objects, advantages, modes, and embodiments will become obvious to those skilled in the art by reference to the detailed description and accompanying drawings which illustrate what is presently considered to be a preferred embodiment of the best mode contemplated for utilizing the novel principles set forth in the claims.

BRIEF DESCRIPTION OF THE DRAWINGS

FIG. 2 is an exploded view of the cartridge joint of the present invention, together with fork-and-blade track links, a midpitch drive lug, and a track shoe;

FIG. 3 is a cross-sectional illustration of the cartridge joint of the instant invention.

DETAILED DESCRIPTION

Figure 1:
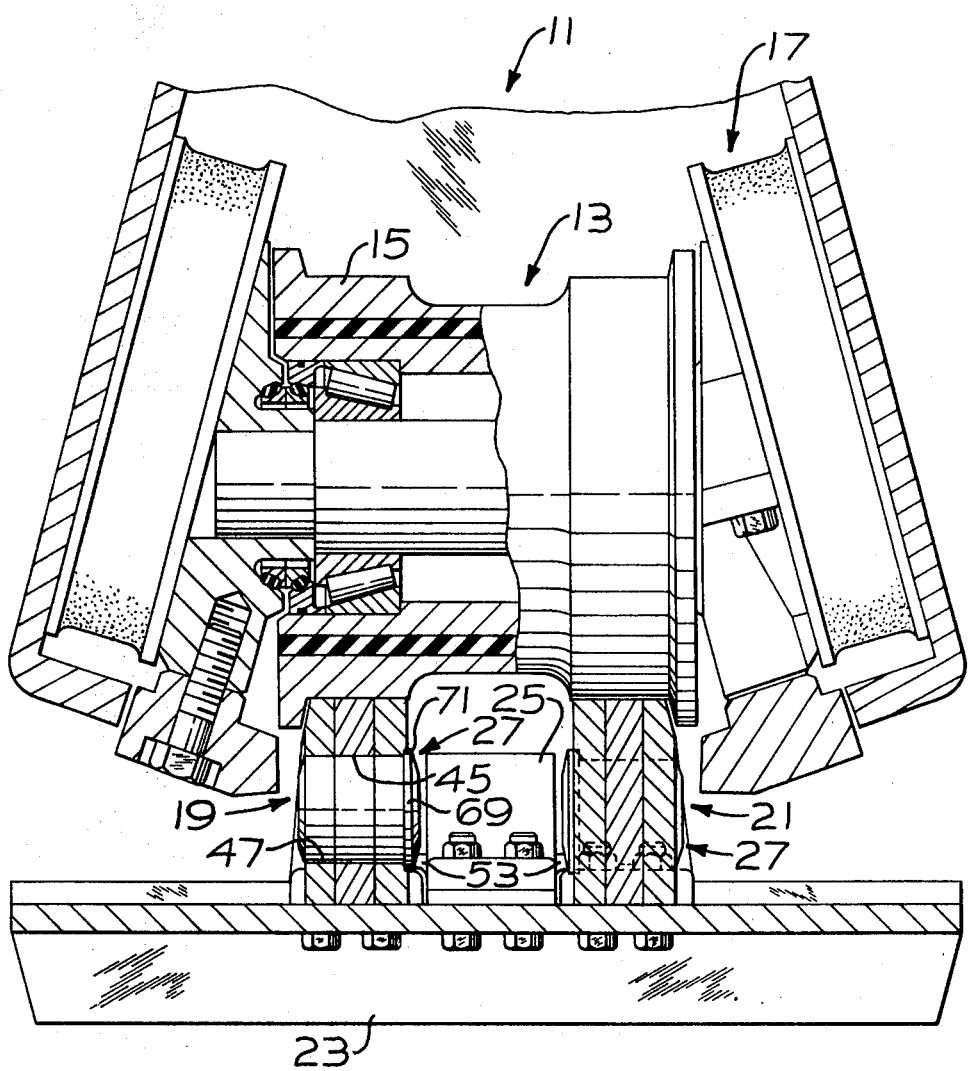
FIG. 1 is a cross-sectional illustration of a heavy-duty tractor suspension system.

Referring now to FIG. 1, there is shown a heavy-duty tractor suspension system 11 embodying track rollers, one of which is shown at 13, having resiliently supported rims 15. An example of such a resiliently mounted rim may be found in U.S. Pat. No. 2,647,025, issued July 28, 1953, and assigned to the assignee hereof. The rollers may be supported by a resilient roller frame mounting which is generally illustrated at 17. Such a mounting has been fully described in U.S. Pat. No. 3,336,087, issued Aug. 15, 1967, and assigned to the assignee hereof.

Track linkages, generally illustrated at 19 and 21 are suitably mounted upon a track shoe 23 in a manner to be described. A midpitch drive apparatus 25 is also mounted on the track shoe for cooperation with the vehicle drive sprockets (not shown). Such a drive arrangement has been illustrated in U.S. application Ser. No. 669,218, filed Sept. 20, 1967, and assigned to the assignee hereof.

Use of the midpitch drive arrangement 25 produces efficient transmission of power to the track shoe, while facilitating service of the track linkage joints through the use of readily replaceable cartridge joints or chain drive lugs 27.

Referring now to FIG. 2, the drive chain 19 has been illustrated to show two links 31 and 33 thereof. As can be seen, each link has a blade 35 on one end thereof and a bifurcated section having sides 37 on the opposite end thereof. Each link is fastened to a track shoe 23 by means of bolts 39 which extend through the drive links to receive nuts 41 thereon. The cartridge joint 27 is then placed within the coaxially aligned holes 45 and 47 in the links 31 and 33.

A formed plate 49 is then mounted over bolts 51 on the track shoe 23 so that an end section 53 thereof will serve to hold the cartridge joint 27 in the position previously described. The midpitch drive apparatus 25 is then placed on top of the plate 49 and this structure is then fastened to the drive shoe by nuts 55.

As shown in FIG. 3, the cartridge joint 27 comprises a hollow pin 61 having a head or shoulder 63 thereon. A ring 65 is fixed to the other end of the pin 61, such as by a weld 67. A flange 69 on the ring 65 serves to abut a groove 71 in the face of fork 37 so as to prevent the joint from moving axially relative to the apertures 45 and 47.

A rotatable bushing 75 is mounted intermediate the head 63 and the ring 65 for rotation about the hollow pin 61. An abutment surface 76 on the head and an abutment surface 78 on the ring serve to position the bushing relative to the axis of pin 61. A pair of seals 77 and 79 are mounted within grooves 81 and 83 of the head and ring respectively so as to prevent lubricant in the pin counterbore 85 and radial aperture 87 from escaping from the joint or from being contaminated by dirt or foreign matter outside the joint. Abutment surfaces 76 and 78 serve to position bushing 75 such that constant pressure on the sealing faces of the seals is maintained at all times. A plug 89 threadably mounted in the outer end of the counterbore 85 keeps the lubricant from being contaminated or from escaping.

In this manner, the cartridge joint may be mass produced as a lifetime-lubricated, permanently sealed article and may be utilized on both sets of the links—19 and 21—of the track shoe drive. Further, the joint is maintained within the fork-and-blade pivot of the consecutive links by abutment surface 90 of the shoulder or flange 69 on the ring 65, as well as by the formed plate 49. Replacement of a cartridge joint in the field merely requires that the midpitch drive apparatus 25 and plate 49 be removed from the track shoe, the old cartridge joint driven out of the apertures 45 and 47, a new cartridge joint inserted, and the apparatus reassembled. Thus, only a light press fit of the joint members within apertures 45 and 47 is necessary.

The applicant has thus described only an embodiment of a new and improved concept in the track-linkage art which yields a true advance in the art.

Many modifications and alterations will be obvious to those skilled in the art, wherefore what is claimed as the invention is:

1. A track assembly comprising
   a plurality of closely coupled ground-engaging track shoes and
   at least one articulated link assembly attached to said shoes, said link assembly comprising
   adjacent pairs of links with each link being detachably connected to a respective one of said track shoes to closely couple said track shoes together, each of said links having a blade end and an opposite fork end, having spaced portions, with the blade end of a first link of each pair of links positioned in overlapped relationship in the fork end of a second link thereof,
   means forming aligned apertures in said overlapped blade and fork ends,
   cartridge-type pivot means mounted in said aligned apertures to be moved axially therein as a unit and pivotally connecting said first and second links together, said pivot means comprising
   a pin member, a head mounted on the pin member and closely fitted within the aperture formed through one of the spaced portions of said fork end, a ring mounted on the pin member and closely fitted within the aperture formed through the other one of spaced portions of said fork end, a bushing mounted on the pin member intermediate the head and ring and closely fitted within the aperture formed through said blade end, and a flange on at least one of said head and said ring engaging one spaced portion of said fork end to limit axial movement of said pivot means in a first direction;

means positioned on said track shoes, closely adjacent to said pivot means, for limiting axial movement of said pivot means in a second direction opposite to said first direction.

2. The invention of claim 1 wherein said means positioned on the track shoes comprises a plate secured to each of said track shoes having a section positioned adjacent to a respective one of said pivot means.

3. A track assembly comprising a plurality of closely coupled ground-engaging track shoes and a pair of laterally spaced, articulated link assemblies attached to said track shoes, each of said link assemblies comprising adjacent pairs of links with each link being detachably connected to a respective one of said track shoes to closely couple said track shoes together, each of said links having a blade end and an opposite fork end, having spaced portions, with the blade end of a first link of each pair of links positioned in overlapped relationship in the fork end of a second link thereof, means forming aligned apertures in said overlapped blade and fork ends, cartridge type pivot means mounted in said aligned apertures to be moved axially therein as a unit in a first direction away from the other one of said laterally spaced link assemblies and pivotally connecting said first and second links together, said pivot means comprising flange means formed thereon and abutting one spaced portion of said fork end to limit axial movement of said pivot means in said first direction; and means positioned on the track shoes, intermediate said laterally spaced link assemblies and closely adjacent to said pivot means, for limiting axial movement of all of said pivot means in a second direction opposite to said first direction.

4. A track assembly comprising a plurality of closely coupled ground-engaging track shoes and at least one articulated link assembly attached to said track shoes, said link assembly comprising adjacent pairs of links with each link being detachably connected to a respective one of said track shoes to closely couple said track shoes together, each of said links having a blade end and an opposite fork end, having spaced portions, with the blade end of a first link of each pair of links positioned in overlapped relationship in the fork end of a second link thereof, means forming aligned apertures in said overlapped blade and fork ends, cartridge type pivot means mounted in said aligned apertures to be moved axially therein as a unit and pivotally connecting said first and second links together, said pivot means comprising a pin having a head on a first end thereof, said head having a head-abutment surface formed thereon to extend radially from the outer periphery of the pin, an annular groove formed in the head having a seal mounted therein, a ring mounted on a second end of the pin, said ring having a ring abutment surface formed thereon to extend radially from the outer periphery of the pin, an annular groove formed in the ring having a seal mounted therein, a bushing mounted on the pin intermediate the head and the ring and in close-abutting relationship to said head and ring abutment surfaces and said seals.

5. The invention of claim 4 wherein the pin further includes an axial bore extending from one end thereof to a distance less than the length of the pin a radial aperture extending from the wall of the axial bore to the periphery of the pin at a position intermediate the head-abutment surface and the ring-abutment surface, and means for closing the open end of the axial bore.